United States Patent Office 2,860,036
Patented Nov. 11, 1958

2,860,036

PURIFICATION OF ANTHRAQUINONE SOLUTIONS

Raymond Lait, St. Albans, England, assignor to Laporte Chemicals Limited, Luton, England, a British company No Drawing. Application April 22, 1954
Serial No. 425,044

Claims priority, application Great Britain May 4, 1953

14 Claims. (Cl. 23—207)

This invention relates to improvements in the purification of solutions of substituted anthraquinones and is particularly concerned with the removal of substituted nuclear hydrogenated anthraquinols therefrom and their recovery and conversion back to the corresponding substituted anthraquinones.

It is well known that hydrogen peroxide can be manufactured by a process employing the reduction and autoxidation of certain organic compounds. These organic compounds, for example, substituted anthraquinones, are subjected, in solution, to alternate reduction with hydrogen followed by oxidation with oxygen or other gas containing free oxygen, such as air. The hydrogen peroxide formed by the oxidation step is removed, e. g., by aqueous extraction and the autoxidised compound is reduced back to the substituted anthraquinol, so that such a process can be made cyclic. The oxidation of the substituted anthraquinol to the substituted anthraquinone is represented as follows:

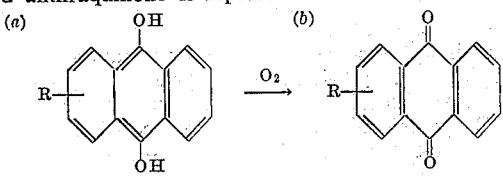

while the reduction of the autoxidised compound back to the substituted anthraquinol is represented as follows:

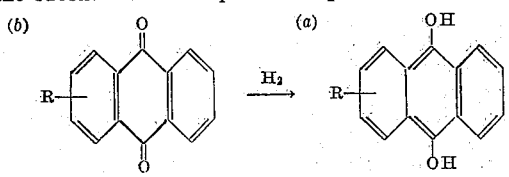

(wherein R represents one or more substituents).

Sometimes the reduction is only allowed to go to the substituted anthraquinhydrone, this being an equimolecular mixture of the compounds $a$ and $b$ above. It is well-known that this reduction stage of the process can be carried out with hydrogen in the presence of a catalyst. Various catalysts have been proposed for use in the reduction stage, e. g. activated nickel or palladium, the latter being described in United States application Serial No. 350,519, now abandoned, and in United Kingdom specification No. 686,574. In addition to the main reduction reaction shown above, there is also a subsidiary reaction in which the nucleus is hydrogenated. This nuclear hydrogenation reaction results predominantly in the formation of the corresponding substituted tetrahydroanthraquinol or tetrahydro-anthraquinhydrone, the reaction being represented as follows:

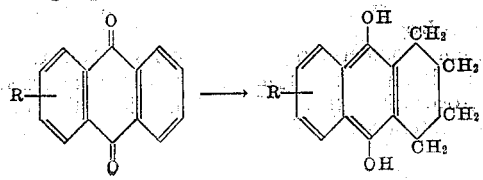

As the hydrogenated nucleus is not readily oxidised, this reaction is irreversible under the conditions of the cycle.

Some of this substituted tetrahydro-anthraquinol or tetrahydro-anthraquinhydrone is formed in each cycle of the process, its concentration building up in the solution as the number of cycles increases. The rate of autoxidation of the substituted tetrahydro-anthraquinol or tetrahydro-anthraquinhydrone is much lower than that of the substituted anthraquinol, so that in a cycle based on the use of the substituted anthraquinhydrone or the substituted anthraquinol, in which the oxidation stage is designed for the reaction of one of these compounds, the substituted nuclear hydrogenated anthraquinol or anthraquinhydrone passes through without being completely oxidised. This has the important disadvantage that an increasing quantity of material which is much less readily oxidised under the conditions of a cycle based on the substituted anthraquinol or quinhydrone, is carried round the cycle gradually reducing the output of the process and causing increasing loss of the substituted anthraquinone, this being gradually converted to the substituted tetrahydroanthraquinol. The output of the process may be kept up by continually adding substituted anthraquinone to the cycle to replace that lost owing to the formation of the tetrahydro compound, but this can lead ultimately to undesirable crystallisation of the tetrahydro compound in the process.

This nuclear hydrogenation side reaction is known and German specification No. 801,840 proposes to obviate it as far as possible by using selectively effective nickel catalysts obtained by pre-treating the nickel catalyst with ammonium salts. It is claimed that such catalysts effect hydrogenation of quinones to quinols with greatly reduced hydrogenation of the organic nucleus.

It has now been found according to this invention that part of the substituted tetrahydro-anthraquinol which passes unreacted through the oxidation stage of the process, can be effectively removed from the solution after oxidation of the substituted anthraquinol or substituted anthraquinhydrone, but without complete oxidation of the substituted tetrahydro-anthraquinol and recovered as substituted tetrahydro-anthraquinone and/or substituted anthraquinone.

Thus, the process of the present invention for the removal of a substituted tetrahydro-anthraquinol from a solution containing it and its recovery as a substituted tetrahydro-anthraquinone and/or substituted anthraquinone comprises contacting a solution containing the substituted tetrahydroanthraquinol in an organic solvent with an aqueous solution of a water-soluble metallic hydroxide, preferably sodium hydroxide, to form a water-soluble salt of the tetrahydro-anthraquinol and after separating from the organic solution subjecting the aqueous solution to treatment with oxygen or an oxygen-containing gas, such as air, or other oxidising agent to precipitate the corresponding substituted tetrahydroanthraquinone and/or substituted anthraquinone, which is then separated from the solution for example by filtration.

The oxidation may be stopped at the stage at which the substituted tetrahydro-anthraquinone is obtained. In this case the substituted tetrahydro-anthraquinone is preferably treated, with or without solution in a solvent, with a dehydrogenation catalyst, e. g. palladium on gamma alumina, magnesia or charcoal, to convert it into the corresponding substituted anthraquinone. Alternatively, the substituted tetrahydroanthraquinone may be dehydrogenated in other ways, for example by treatment with air or oxygen.

Normally the solution of the substituted tetrahydroanthraquinol in the organic solvent will be the cycling solution used in the manufacture of hydrogen peroxide by the process outlined above.

In order to make the removal of the substituted tetrahydro-anthraquinol part of the cyclic process it is convenient to pass the solution containing it through the solution of the water-soluble metallic hydroxide. However, continued treatment of the solution containing the substituted tetrahydro-anthraquinol with the alkali metal hydroxide, such as sodium hydroxide, solution results in hydrolysis of esters such as cyclohexanol esters and alkyl cyclohexanol esters usually used as solvents. When such esters are used as solvents it is preferable to avoid continuous treatment with the alkali metal hydroxide solution and only to use it when the concentration of substituted tetrahydro-anthraquinone reaches too high a value for efficient working. The difficulty may be avoided in another way by adding a salt such as sodium sulphate or sodium chloride to the alkali metal hydroxide solution to repress hydrolysis of the ester.

It has been found that sodium hydroxide solution will effectively remove the substituted tetrahydro-anthraquinol from the cycling solution, but other alkali metal hydroxides such as potassium hydroxide may also be used.

During the process phenols and other acidic substances which would contaminate the hydrogen peroxide product and which may also lead to de-activation of the catalyst are also formed in the cycling solution. It has been found that these substances are also removed by the metallic hydroxide solution.

The solution of the substituted tetrahydro-anthraquinol in the water-soluble metallic hydroxide may be treated in various ways to recover a substituted tetrahydro-anthraquinone and/or a substituted anthraquinone.

Thus, according to one embodiment of the invention, a solution, preferably a saturated solution, of the substituted tetrahydro-anthraquinol in a water-soluble metallic hydroxide, preferably sodium hydroxide, is heated approximately to the boiling point and a stream of oxygen or air passed therethrough with mechanical agitation until the substituted tetrahydro-anthraquinol is converted into the corresponding substituted anthraquinone. This usually takes 2 to 5 hours.

According to another embodiment the solution of the substituted tetrahydro-anthraquinol in the water-soluble metallic hydroxide is treated with oxygen until precipitation of the substituted tetrahydro-anthraquinone results. After removal by filtration it may be dissolved in a high boiling point solvent, e. g. di-methyl phthalate, dehydrogenated, e. g. by treatment with a palladium catalyst on alumina, at a high temperature, e. g. 250° C. The dehydrogenation catalyst converts it back to the substituted anthraquinone which may be returned to the process.

Alternatively the substituted tetrahydro-anthraquinone to be dehydrogenated may be suspended in an aqueous or alcoholic solution of a water-soluble metal hydroxide, preferably sodium hydroxide, heated approximately to the boiling point and air or oxygen passed through the solution until the substituted anthraquinone is formed.

It is, of course, possible to design a cyclic process for the manufacture of hydrogen peroxide utilising the reduction of the substituted tetrahydro-anthraquinone with subsequent substantially complete oxidation of the substituted tetrahydro-anthraquinol back to the substituted tetrahydro-anthraquinone, but this is not normally desirable owing to the increased size and cost of plant required.

The present invention also includes a cyclic process for the manufacture of hydrogen peroxide by the autoxidation of a substituted anthraquinhydrone or substituted anthraquinol in a solvent mixture with oxygen or a gas containing free oxygen with a subsequent removal of the hydrogen peroxide, followed by the reduction of the substituted anthraquinone formed in the solution to the substituted anthraquinhydrone or substituted anthraquinol by hydrogen in the presence of a catalyst, the autoxidised solution after extraction of the hydrogen peroxide being passed in each cycle or in some of the cycles through an aqueous solution of a water-soluble metallic hydroxide, preferably sodium hydroxide, to remove the substituted tetrahydro-anthraquinol formed, which is recovered as the substituted anthraquinone and/or substituted tetrahydro-anthraquinone, by treating the aqueous solution after separation from the organic solution with oxygen or an oxygen-containing gas such as air, or other oxidising agent, and returned to the process after converting any substituted tetrahydro-anthraquinone into substituted anthraquinone.

The sodium hydroxide solution which is preferably used to remove the substituted tetrahydro-anthraquinol retains it as the sodium salt whence it can be recovered and converted to the substituted anthraquinone for return to the process. Thus, the process of the present invention prevents loss of the expensive substituted anthraquinone from the process. Formerly the substituted tetrahydroquinol built up in the solution to such an extent that the only remedy was to reject this solution either periodically or continuously and recharge the cycle with a fresh supply of substituted anthraquinone.

The following examples illustrate how the process of the invention may be carried into effect:

(1) A solution containing 40 gms. per litre of tetrahydro-2-ethyl-anthraquinol and 45 gms. per litre of 2-ethyl-anthraquinone in a benzene-methyl cyclohexanol acetate solution (50/50 by vol.) was treated with an equal volume of sodium hydroxide solution (70 gms./litre). The residual concentration of tetrahydro-2-ethyl-anthraquinol in the organic layer was 4.5 gms. per litre. The solution in the sodium hydroxide was separated and treated with gaseous oxygen. 34 gms. per litre of tetrahydro-2-ethyl-anthraquinone were precipitated from the sodium hydroxide solution. The theoretical yield was 35.5 gms. per litre. The precipitated tetrahydro-2-ethyl-anthraquinone was then removed by filtration and dissolved in di-methyl phthalate as solvent using 25 gms. of solute per litre of solvent. This solution was heated to 260° C. for ten minutes in the presence of 5 gms. per litre of a catalyst containing 5% of palladium on activated gamma alumina, this catalyst acting as a dehydrogenation catalyst. The resulting solution contained 14.4 gms. per litre of 2-ethyl anthraquinone from which it could be recovered and returned to the cycle.

(2) A solution containing 40 gms. per litre of tetrahydro-2-ethyl-anthraquinol and 45 gms. per litre of ethyl anthraquinone in a benzene-methyl cyclohexanol acetate solution (50/50 by vol.) was treated with an equal volume of sodium hydroxide solution (70 gms./litre). The residual concentration of tetrahydro-2-ethyl-anthraquinol in the organic layer was 4.5 gms. per litre. The solution in the sodium hydroxide was separated and treated with gaseous oxygen. 34 gms. per litre of tetrahydro-2-ethyl-anthraquinone were precipitated from the sodium hydroxide solution. The theoretical yield was 35.5 gms. per litre. 25 gms. of the precipitated tetrahydro-2-ethyl-anthraquinone was dissolved in 1 litre of dibutyl phthalate. This solution was heated at 310° C. for one hour in the presence of 5 gms. of a catalyst consisting of 5% palladium on gamma alumina. The yield was 22.4 gms. of 2-ethyl anthraquinone.

(3) 4.5 litres of an organic solution consisting of 100 gms. of 2-ethyl anthraquinone in each litre of a mixture of equal volumes of benzene and of methyl cyclohexanol acetate (ester content of the latter was 97%) was passed through a hydrogenation vessel, containing catalyst agitated by a stream of hydrogen. The reduced solution, filtered to remove catalyst, was oxidised with a stream of air and hydrogen peroxide was extracted with water in a conventional counter-current plate column. The extracted solution, after a partial drying treatment, was returned to the hydrogenation stage. The rate of circulation of the organic solution was 1.5 litres/hour.

3 gms. of a palladium catalyst, containing 2.18% Pd on 100–240 (B. S. S.) mesh gamma alumina was added to the hydrogenator at the start of each experiment, and hydrogenation was carried out until the catalyst was substantially completely de-activated. The total weight of hydrogen peroxide formed during this process was determined.

Two sets of experiments were carried out: conditions for the first set were as described above, but for the second set the extracted solution was passed through an aqueous solution containing 140 gms. per litre of sodium hydroxide. The conditions were such that tetrahydro-anthraquinol formed was completely oxidised during the oxidation stage, and, therefore, none was extracted, but the table shows the effect of the treatment on the yield of hydrogen peroxide obtained during each experiment. Results for two successive runs in each set are given.

| Treatment | Gms. of $H_2O_2$ per gm. of catalyst |
|---|---|
| Partial drying | 118 |
| Do | 111 |
| Partial drying + sodium hydroxide | 159 |
| Do | 177 |

(4) 62 litres of a solution containing 49 gms. per litre of 2-ethyl-anthraquinone and 22 gms. per litre of tetrahydro-2-ethyl-anthraquinone dissolved in a solvent mixture of equal volumes of methyl cyclohexanol acetate and an aromatic hydrocarbon mixture consisting mainly of di- and tri-alkyl benzenes were passed through a hydrogenation vessel containing a palladium on alumina catalyst, and agitated in a stream of hydrogen. The hydrogenated solution, which now contained the reduced forms of the 2-ethyl-anthraquinone and tetrahydro-2-ethyl-anthraquinone in a concentration of 4 to 5 gms. per litre (as equivalents of hydrogen peroxide) was filtered to remove the catalyst. A stream of air was then blown through the solution whereby all the 2-ethyl-anthraqninol and part of the tetrahydro-2-ethyl-anthraquinol were autoxidised. The concentration of the latter after oxidation was 11 to 13 gms. per litre (or 1.5 to 1.7 gms. per litre as equivalent hydrogen peroxide). The hydrogen peroxide formed as a result of the autoxidation was extracted with water using a conventional counter-current plate column. After extraction of the hydrogen peroxide, the solvent solution was passed through a column containing 2 litres of sodium hydroxide solution (50 gms. per litre of NaOH) and then returned to the hydrogenation stage. The rate of circulation of the organic solution was 30 litres per hour. As soon as the sodium hydroxide solution ceased to absorb the tetrahydro-2-ethyl-anthraquinol, it was replaced by fresh sodium hydroxide solution. Air was then blown through the sodium hydroxide solution of the sodium salt and solid tetrahydro-2-ethyl-anthraquinone was removed by filtration. By repeating this process, the tetrahydro-2-ethyl-anthraquinone concentration in the organic layer was reduced to 5 gms. per litre. Analysis of the organic solution showed that the tetrahydro-2-ethyl-anthraquinone lost from the organic solution was 1054 gms., while the amount recovered from the sodium hydroxide solution was 980 gms. (93% recovery).

(5) A solution containing 40 gms. per litre of tetrahydro-2-ethyl-anthraquinol and 45 gms. per litre of 2-ethyl-anthraquinone in a benzene-methyl cyclohexanol acetate solution (50/50 by vol.) was treated with an equal volume of sodium hydroxide solution (70 gms./litre). The residual concentration of tetrahydro-2-ethyl-anthraquinol in the organic layer was 4.5 gms. per litre. The solution in the sodium hydroxide was separated and treated with gaseous oxygen. 34 gms. per litre of tetrahydro-2-ethyl-anthraquinone were precipitated from the sodium hydroxide solution. The theoretical yield was 35.5 gms. per litre. The precipitated tetrahydro-2-ethyl-anthraquinone was then removed by filtration, washed first with aqueous sodium hydroxide solution, and then with water and dried at 60° C. The tetrahydro-2-ethyl-anthraquinone was then powdered and suspended in a sodium hydroxide solution containing 80 gms. of NaOH per litre. Air was blown through this suspension which was heated to approximately boiling point. After about 10 hours, the reaction was completed and the mixture allowed to cool. The 2-ethyl-anthraquinone was removed by filtration as a dark grey solid. It was washed with sodium hydroxide solution and water, and dried at 60° C.

(6) A solution obtained as in Example 4 containing 14.6 gms. of tetrahydro-2-ethyl-anthraquinol as the sodium salt in 940 ml. of sodium hydroxide solution (50 gms. of NaOH per litre) was heated to the boiling point and air passed therethrough for 1¾ hours after which the mixture was allowed to cool. 14.5 gms. of a dark grey solid were removed by filtration, and this was found to contain 8.1 gms. of 2-ethyl-anthraquinone and 1.3 gms. of tetrahydro-2-ethyl-anthraquinone. The conversion back to 2-ethyl-anthraquinone was 55%.

(7) 1 gm. of solid tetrahydro-2-ethyl-anthraquinone recovered from the sodium hydroxide solution as described in Example 5 was mixed with 0.2 gm. of palladium on magnesium hydroxide catalyst (15% Pd) and heated in a flask over an oil bath to 198° C. for ten minutes. The flask was evacuated and a slow current of nitrogen was passed through the molten mixture to facilitate dispersion of the catalyst and removal of the liberated hydrogen. After heating, the flask was allowed to cool, and the cold residue was dissolved in benzene, and the solution filtered to remove the catalyst. The conversion to 2-ethyl-anthraquinone was 40% and the remaining 60% was recovered unchanged.

(8) 8.6 gms. of solid tetrahydro-2-ethyl-anthraquinone recovered from the sodium hydroxide solution as described in Example 5 was mixed with 0.17 gm. of palladium on alumina catalyst (5% Pd) and heated in a flask over an oil bath at 260° C. for 180 minutes. The flask was evacuated and a slow current of nitrogen was passed through the molten mixture to facilitate dispersion of the catalyst and removal of the liberated hydrogen. After heating, the flask was allowed to cool, and the cold residue was dissolved in benzene, and the solution filtered to remove the catalyst. The conversion to 2-ethyl-anthraquinone was 65%.

(9) 2.0 gms. of tetrahydro-2-ethyl-anthraquinone recovered from the sodium hydroxide solution as described in Example 5 was added to 40 ml. of a solution containing 50 gms. of potassium hydroxide per litre of 95% aqueous ethanol. Air was now blown through this suspension for 24 hours at room temperature. After dilution with water, and neutralisation with hydrochloric acid, a solid was obtained by filtration consisting of 1.2 gms. of crude 2-ethyl-anthraquinone (75% purity).

The crude 2-ethyl-anthraquinone obtained in the above examples may be purified as follows:

The crude 2-ethyl-anthraquinone is dissolved in a minimum volume of benzene or xylene. This solution is then filtered to remove the benzene or xylene solution from the solid material. The filtrate is then poured down a column of alumina. The resultant purified solution of 2-ethyl-anthraquinone may be returned to the process as such, or the solid may be obtained by evaporation. A variation of this method is to dissolve the crude solid 2-ethyl-anthraquinone in xylene and add powdered alumina to the solution. After stirring and filtration, a purified solution of 2-ethyl-anthraquinone is obtained.

The treatment of the anthraquinone solution with the water-soluble metallic hydroxide, preferably sodium hydroxide, results in the following advantages:

(1) Absorption of substituted tetrahydro-anthraquinol produced in the cycle.

(2) Removal of phenolic impurities produced in the cycle.

(3) Treatment with the hydroxide extracts the substituted tetrahydro-anthraquinol which may then be recovered direct as substituted anthraquinone or in a form suitable for conversion back to the substituted anthraquinone, e. g. by dehydrogenation.

Any suitable substituted anthraquinone may be used, for example the methyl, ethyl, propyl and butyl substituted compounds.

What I claim is:

1. A process for the removal of substituted tetrahydro-anthraquinols from substituted anthraquinones in an organic solvent solution resulting from the oxidation step of the cyclic process for the production of hydrogen peroxide including the alternate reduction and oxidation of said substituted anthraquinone dissolved in said solvent comprising contacting said organic solution with an aqueous solution of a water-soluble metal hydroxide to form a water-soluble salt of said tetrahydro-anthraquinol, separating said solutions from one another, oxidizing said tetrahydro-anthraquinol salt in said separated aqueous solution to precipitate a compound selected from the group consisting of a substituted tetrahydro-anthraquinone and a substituted anthraquinone, and separating said compound from said aqueous solution.

2. A process for the removal of a substituted tetrahydro-anthraquinol as claimed in claim 1 wherein said solutions are contacted by passing said organic solution through said aqueous solution.

3. A process for the removal of a substituted tetrahydro-anthraquinol as claimed in claim 1 wherein said hydroxide is sodium hydroxide.

4. A process for the removal of substituted tetrahydro-anthraquinol as claimed in claim 3 wherein said tetrahydro-anthraquinol salt in said separated aqueous solution is oxidized with air.

5. A process for the removal of a substituted tetrahydro-anthraquinol as claimed in claim 1 wherein said precipitated compound is a substituted tetrahydro-anthraquinone.

6. A process for the removal of a substituted tetrahydro-anthraquinol as claimed in claim 5 wherein said separated tetrahydro-anthraquinone is converted by treatment with an oxygen-containing gas to the corresponding substituted anthraquinone.

7. A process for the removal of a substituted tetrahydro-anthraquinol as claimed in claim 5 wherein said hydroxide is sodium hydroxide.

8. A process for the removal of a substituted tetrahydro-anthraquinol as claimed in claim 7 wherein said tetrahydro-anthraquinol in said separated aqueous solution is oxidized with air.

9. A process for the removal of a substituted tetrahydro-anthraquinol as claimed in claim 5 wherein said separated tetrahydro-anthraquinone is converted by treatment with a dehydrogenation catalyst to the corresponding substituted anthraquinone.

10. A process for the removal of a substituted tetrahydro-anthraquinol as claimed in claim 9 wherein said catalyst is a palladium catalyst.

11. A process for the removal of tetrahydro-2-ethyl-anthraquinol from 2-ethyl-anthraquinone in an organic solvent solution resulting from the oxidation step of the cyclic process for the production of hydrogen peroxide including the alternate reduction and oxidation of said 2-ethyl-anthraquinone dissolved in said solvent comprising contacting said organic solution with an aqueous solution of a water-soluble metal hydroxide to form a water-soluble salt of tetrahydro-2-ethyl-anthraquinol, separating said solutions from one another, oxidizing said salt of tetrahydro-2-ethyl-anthraquinol in the aqueous solution to precipitate a compound selected from the group consisting of tetrahydro-2-ethyl-anthraquinone and 2-ethyl-anthraquinone, and separating said compound from said aqueous solution.

12. In a cyclic process for the manufacture of hydrogen peroxide by the autoxidation of a composition selected from the group consisting of substituted anthraquinhydrones and substituted anthraquinols in a solvent mixture with a gas consisting at least in part of free oxygen with subsequent removal of the hydrogen peroxide, followed by the reduction of the substituted anthraquinone formed in the solution to the composition selected from the group consisting of substituted anthraquinhydrones and substituted anthraquinols by hydrogen in the presence of a catalyst, the steps of passing the autoxidised solution in at least some of the cycles through an aqueous solution of a water-soluble metallic hydroxide to remove the substituted tetrahydro-anthraquinol present, separating the aqueous solution from the organic solution, treating the aqueous solution with an oxidising agent to convert the substituted tetrahydro-anthraquinol to the corresponding substituted anthraquinone and returning said substituted anthraquinone to the process.

13. In a cyclic process for the manufacture of hydrogen peroxide by the autoxidation of a composition selected from the group consisting of substituted anthraquinhydrones and substituted anthraquinols in a solvent mixture with a gas consisting at least in part of free oxygen with subsequent removal of the hydrogen peroxide, followed by the reduction of the substituted anthraquinone formed in the solution to the composition selected from the group consisting of substituted anthraquinhydrones and substituted anthraquinols by hydrogen in the presence of a catalyst, the steps of passing the autoxidised solution in at least some of the cycles through an aqueous solution of a water-soluble metallic hydroxide to remove the substituted tetrahydro-anthraquinol present, separating the aqueous solution from the organic solution, treating the aqueous solution with an oxygen-containing gas to convert the substituted tetrahydro-anthraquinol to the corresponding substituted anthraquinone and returning said substituted anthraquinone to the process.

14. In a cyclic process for the manufacture of hydrogen peroxide by the autoxidation of a composition selected from the group consisting of substituted anthraquinhydrones and substituted anthraquinols in a solvent mixture with a gas consisting at least in part of free oxygen with subsequent removal of the hydrogen peroxide, followed by the reduction of the substituted anthraquinone formed in the solution to the composition selected from the group consisting of substituted anthraquinhydrones and substituted anthraquinols by hydrogen in the presence of a catalyst, the steps of passing the autoxidised solution in at least some of the cycles through an aqueous solution of a water-soluble metallic hydroxide to remove the substituted tetrahydro-anthraquinol present, separating the aqueous solution from the organic solution, treating the aqueous solution with an oxidising agent to convert the substituted tetrahydro-anthraquinol to the corresponding substituted tetrahydro-anthraquinone, converting said tetrahydro-anthraquinone into the corresponding substituted anthraquinone and returning said substituted anthraquinone to the process.

References Cited in the file of this patent

UNITED STATES PATENTS

| 2,495,229 | Dawsey et al. | Jan. 24, 1950 |
| 2,668,753 | Harris et al. | Feb. 9, 1954 |
| 2,739,042 | Corey et al. | Mar. 20, 1956 |

FOREIGN PATENTS

| 463,830 | Germany | Aug. 3, 1928 |

OTHER REFERENCES

Heilbron: "Dictionary of Organic Compounds," 1934, vol. I, page 96.

Heilbron: "Dictionary of Organic Compounds," 1938, vol. III, page 691.